United States Patent [19]

Evans et al.

[11] 3,882,743

[45] May 13, 1975

[54] APPARATUS FOR MAKING SLOT DRAINAGE CULVERT

[75] Inventors: Ralph E. Evans, Middletown, Ohio; Howard E. Blower, Oakland, Calif.

[73] Assignee: Armco Steel Corporation, Middletown, Ohio

[22] Filed: Mar. 15, 1974

[21] Appl. No.: 451,435

Related U.S. Application Data

[62] Division of Ser. No. 307,137, Nov. 16, 1972, Pat. No. 3,815,213, which is a division of Ser. No. 60,516, Aug. 3, 1970, Pat. No. 3,714,786.

[52] U.S. Cl. ..................... 83/156; 83/54; 83/418; 83/461; 83/465; 83/466; 83/471.2; 83/487
[51] Int. Cl. ........................................... B23d 45/02
[58] Field of Search ....... 83/54, 156, 487, 488, 458, 83/459, 460, 461, 465, 466, 418, 471.2, 678

[56] References Cited
UNITED STATES PATENTS

| | | | |
|---|---|---|---|
| 2,629,164 | 2/1953 | Pridy | 83/54 X |
| 3,545,336 | 12/1970 | Savko | 83/54 X |

Primary Examiner—J. M. Meister
Attorney, Agent, or Firm—Melville, Strasser, Foster & Hoffman

[57] ABSTRACT

An open slot culvert for positioning in a drainage area with the open slot at the top so that any surface drainage water will flow through the slot and directly into the culvert, including a method and apparatus for its manufacture. The improved open slot culvert comprises a metallic, pipe section, split longitudinally along its upper side to form a narrow slot, and grate means, including two spaced, vertical bearing members joined by spacer means, secured in the slot. The method of making the improved open slot culvert includes the steps of providing two elongated, parallel, vertical members in spaced relation having a plurality of spacer means therebetween, longitudinally splitting the upper side of a metallic pipe section to form a narrow slot, and properly positioning the grate means within the narrow slot. The apparatus for making the improved open slot culvert generally comprises an entry pipe station, a pipe clamp, saw and tack welding station, and a finish welding and exit station.

8 Claims, 16 Drawing Figures

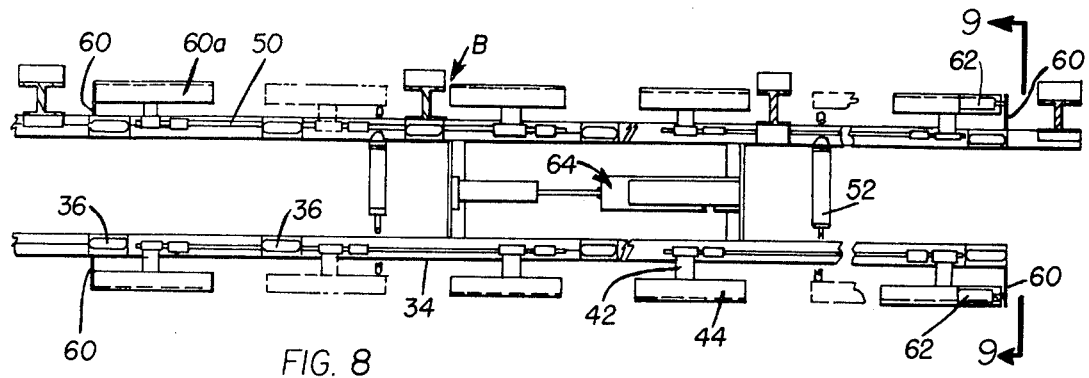
FIG. 8
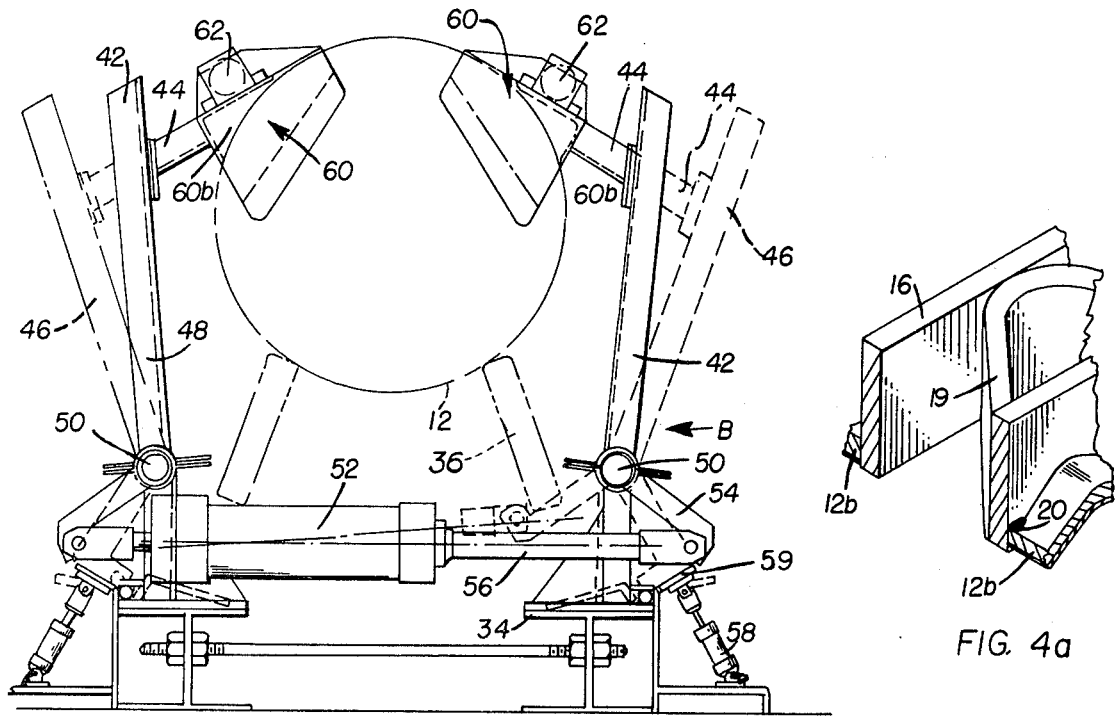
FIG. 9
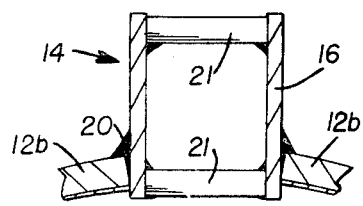
FIG. 4a
FIG. 4b

APPARATUS FOR MAKING SLOT DRAINAGE CULVERT

This application is a division of application Ser. No. 307,137, filed Nov. 16, 1972, now Pat. No. 3,815,213 in the names of Ralph E. Evans and Howard E. Blower, entitled "Method of Making An Improved Slot Drainage Culvert," which is in turn a division of application Ser. No. 60,516, filed Aug. 3, 1970, now U.S. Pat. No. 3,714,786, in the names of Ralph E. Evans and Howard E. Blower, entitled "Drainage Culvert."

BACKGROUND OF THE INVENTION

1. Field of the Invention

This invention relates to open top road drainage culverts.

2. Description of the Prior Art

The prior art has long been concerned with the production of an open top culvert of an improved design that can be more readily constructed and that can be made and installed with a minimum of expense and labor. As will be more fully explained hereinafter, many prior art open top drainage culverts have been developed, and while many have proven to be generally satisfactory in some respects, they all have proven to be unsatisfactory in a number of respects.

FIG. 1a discloses an angle iron type of open top culvert which is the subject matter of U.S. Pat. No. 1,444,198, in the name of R.W. McQueary, wherein the flanges of the angles extended inside the pipe section. There appear to be at least three major problems with this type of design. For example, the McQueary angle iron open top culvert design provides too small an area for paving material, such as asphalt, between the angle iron top flange and the top of the pipe section. Accordingly, this thin section of paving material tends to "spall" after repeated cycling of vehicles across the top flanges of the angle irons. Additionally, the spacing means, such as the rivets and the ferrules, are not in line with the neutral axis of the pipe surface, lowering the ring compression strength. Finally, the McQueary open top culvert can create a clogging problem because the angle irons and the spacing means hang down within the pipe section.

A second basic type of prior art is the flanged slot design as shown in FIG. 1b. The flanged slot design also has the drawback that the spacing means are not lined up with the neutral axis of the pipe surface, since the spacing means passes through the up turned lips of the slit pipe itself. Additionally, since the flanges are bent upward on the corrugated pipe, an irregularity in alignment results, producing a wavy slot opening. There is also a tendency for the pipe section to bow upwardly in the middle, known as the "banana effect". Even if the pipe section is straightened by pushing down in the middle, nonuniform residual stresses will remain in the pipe section and can cause distortion at a subsequent time. Another problem encountered in the flanged slot culvert design is the difficulty in seating the bolts because of the corrugated flanges. Finally, it has been found that during assembly the pipesleeve spacer tends to drop down upon the bolt, due to gravity, and often does not align with the bolt. Accordingly, the pipe spacer is caught at an angle and causes misalignment.

The third type of prior art is represented by the angle slot drainage culvert design shown in FIG. 1c as well as the newer, slightly modified angle slot design shown in FIG. 1d. The modification of FIG. 1d points out an attempt by the prior art to solve the alignment problem which was previously discussed in connection with the design shown in FIG. 1b. As can be seen, due to the fact that the pipe sleeve spacer was often misaligned, the newer modified design of FIG. 1d shows a square tube spacer that is tack welded to the angle iron. Although this is an improvement, extra steps at extra costs are required and there is also a reduced drainage area due to the large cross section of the square tube spacer. Additionally, there is still the problem of the spacer means not being at the neutral axis of the pipe surface. Also, there are additional labor and material costs due to the extra bolts needed to fasten the angles to the pipe surface. Not only does this require extra parts and extra fabrication steps, there is also a problem developed in the proper seating of the bolts and angle irons at the pipe surface, causing alignment problems.

SUMMARY OF THE INVENTION

The present invention provides an improved open slot drainage culver, including a method and apparatus for the manufacture thereof.

Briefly, the open slot drainage culvert of the present invention, which is positioned in a drainage area, such as in or near a road bed, with the open slot at the top so that any surface drainage water will flow through the slot and directly into the culvert, the culvert being satisfactorily backfilled in a known manner by utilizing any suitable material with the upper surface of the drainage area substantially on a level with the upper surface of the open slot of the culvert, comprises a metallic, pipe section, split longitudinally along its upper side to form a narrow slot, and grate means secured in the slot. The grate means comprises two spaced, vertical bearing members, substantially normal to the axis of the pipe section and extending longitudinally the length of the slot. The bearing members are joined by spacer means substantially normal to the vertical bearing members and substantially at the neutral axis of the pipe section wall so as to provide improved ring compression strength.

The open slot drainage culvert of the present invention solves all of the aforementioned problems which are present in prior art open slot culvert designs. As compared to the culvert design shown in FIG. 1a, the culvert design of the present invention has a more extended upright section above the pipe surface which precludes the creation of a thin section of paving material. The spacing means, such as the solid cross bar spacers, are substantially at the neutral axis of the surface of the pipe section wall in order to obtain improved ring compression strength. Since neither the bearing members nor the bar spacers hang down within the pipe section itself, there is less clogging. There is also no irregularity in alignment due to any bent flanges, as the culvert of the present invention utilizes a pre-fabricated straight grate. The design and manufacturing method of making the present invention with a pre-fabricated straight grate eliminates the tendency for the entire length of pipe section to bow upwardly in the middle, as with the flanged slot design. In fact, there is a tendency for the drainage culvert of the present invention to bow downwardly after fabrication. Therefore, compensation is made in the fabrication of the drainage culvert of the present invention prior to welding, and the subsequent bowing downwardly actually causes a straight section with little or no residual stresses remaining in the section. Finally, since the grate means of the culvert of the present invention uses welded spacer means, there are no alignment problems that are generally associated with the alternative use of bolts and pipe spacers.

The present invention also provides a method of making the improved open slot drainage culvert. Briefly, the method includes the steps of providing two elongated, parallel, vertical members in spaced relation having spacing means therebetween, the spacing means being substantially normal to the bearing members. A metallic pipe section is then longtudinally split along its upper side to form a narrow slot. The grate means includes the bearing members and the spacing means, is then inserted within the narrow slot, and properly positioned so that the bearing members are substantially normal to the axis of the pipe section and the spacing means are substantially at the neutral axis of the pipe section wall. Both sides of each of the bearing members are then fillet welded to the pipe section walls. If the pipe section is corrugated, the bearing members are fillet welded at selected crests and valleys of the corrugations of the pipe section and the fillet welds are coated with a protective coating. The method also preferably includes the step of bowing the central portion of the pipe section upwardly before welding the grate means thereto, whereby compensation is provided for a reverse type of bowing, which occurs after fabrication, with substantially no residual stresses remaining in the pipe section after welding to cause distortion therein at some later time.

The present invention also provides an apparatus for making the improved open slot drainage culvert. The apparatus generally comprises an entry pipe station, a pipe clamp, saw and tack welding station, and a finish welding and exit station, The entry pipe station has a plurality of spaced parallel rails which accept the pipe sections and ready them for entry into a support means substantially perpendicular to the rails. The pipe clamp, saw and tack welding station has a plurality of pairs of support rolls, each inclined toward the center line axis of the support means and individually adjustable in a vertical and horizontal plane, are attached to the support means. A plurality of adjustable side and end clamps are mounted along the support means, the side clamps being provided with adjustable clamp fixtures at the ends thereof. The side clamps of each pair are movable toward and away from each other from a first disengaged position, wherein they do not contact the sides of a pipe section on the support rolls of the support means, to a second engaged position, wherein they contact the sides of the pipe section. Means are provided for moving the side clamps in each of the pairs from the first disengaged position to the second engaged position, and back again. Saw means are mounted for movement along the length of the support means, substantially located over the center thereof. The finish welding and exit station comprises a support means to hold pipe sections during finish welding and a plurality of spaced parallel roller conveyors.

BRIEF DESCRIPTION OF THE DRAWINGS

FIGS. 4a and 4b are views showing grate means which utilize other spacer means.

FIG. 8 is a plan view of the support means showing the side clamps.

FIG. 9 is an enlarged end elevational view as seen from the line 9 — 9 of FIG. 8 showing exemplary supporting clamps having clamping fixtures.

DESCRIPTION OF THE PREFERRED EMBODIMENTS

Figure 1A:
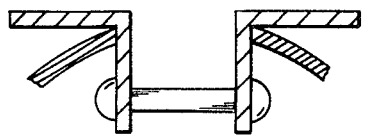
FIG. 1a is a partial cross sectional view through an angle iron drainage culvert of the prior art.
Figure 1B:
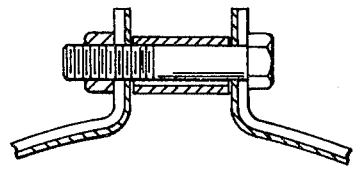
FIG. 1b is a partial cross sectional view through a flanged slot drainage culvert of the prior art.
Figure 1C:
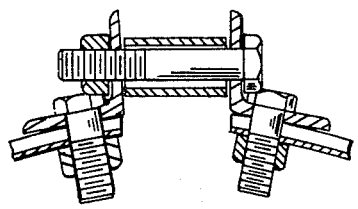
FIGS. 1c and 1d are cross sectional views through other angle slot drainage culverts of the prior art.
Figure 1D:
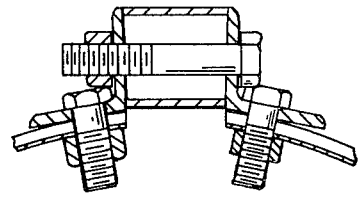
Figure 2:
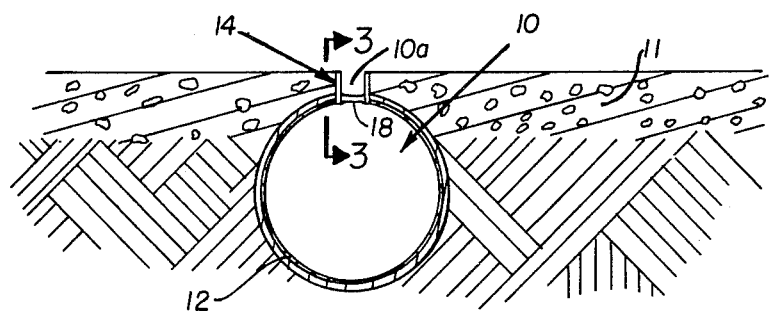
FIG. 2 is an enlarged, partial cross sectional view of the drainage culvert of the present invention installed in a drainage area.

As can be seen from FIG. 2, the open slot culvert 10 of the present invention is positioned in or near a road bed 11 with the open slot 10a at the top so that any surface drainage water will flow through the slot and directly into the culvert 10. The culvert is satisfactorily backfilled in a known manner by utilizing any suitable materials, such as by firmly tamping the fill and topping material of the drainage area against the culvert or by the utilization of cement grout. Although the upper surface of the open slot 10a of the culvert may be level with or slightly recessed from the upper surface of the drainage area, it is, in general, preferred that the upper surface of the open slot 10a be substantially level with the upper surface of the drainage area.

Figure 3:
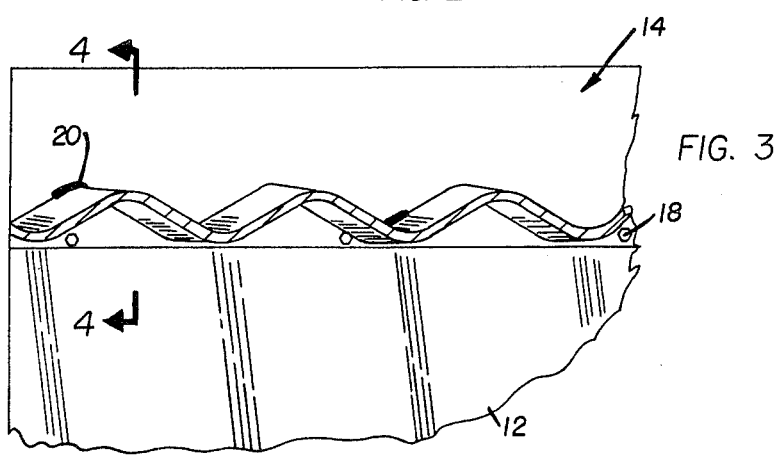
FIG. 3 is a partial longitudinal sectional view through a drainage culvert of the present invention.
Figure 4:
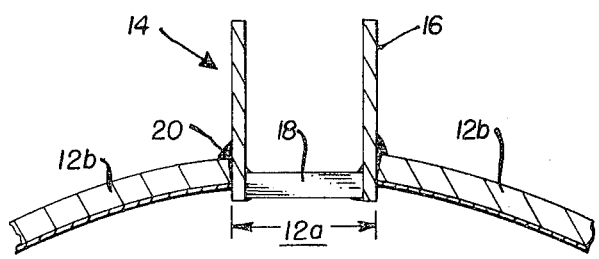
FIG. 4 is a partial, cross sectional view showing the grate slot of the drainage culvert of the present invention taken on the line 4 — 4 of FIG. 3.

It will be seen from FIGS. 3 and 4 that the open slot drainage culvert 10 of the present invention comprises a metallic pipe section 12, which has been split longitudinally along its upper side to form a narrow slot 12a, and grate means 14 secured in the slot. The grate means 14 preferably comprises two spaced, vertical bearing members 16, which are substantially normal to the axis of the pipe section 12 and which extend longtudinally over the major portion of the length of the slot 12a, the bearing members 16 being joined by spacer means. It a preferred embodiment, the spacer means comprises a plurality of solid cross bar spacers 18, as best seen in FIGS. 2 through 4, the axes of the solid cross bar spacers 18 being substantially normal to the vertical bearing member 16 and substantially at the neutral axis of the pipe section wall 12b, so as to provide improved ring compression strength. However, it will, of course, be understood that the spacer means may also comprise the sinusoidal member 19, which is shown in FIG. 4a, or the opposed solid cross bar spacers 21, shown in FIG. 4b.

While the pipe section 12 is preferably helically corrugated and continuously butt welded on a helical angle such that the outside surface thereof across the weld is smooth and free from discontinuities, it will, of course, be understood that annularly corrugated or smooth wall pipe are also satisfactory.

It should be noted that both the pipe section 12 and the assembled grate means 14 may be galvanized as desired.

The vertical bearing members 16 of the grate means 14 are secured to the pipe section 12 as desired, such as by fillet welds 20, which join the surface members 16 and selected crests and valleys of the corrugations of the pipe section wall 12b. In practice, it has been found that it is preferable for the fillet welds to be protected with a zinc coating, such as a zince dust primer. However, an asphalt base print has also been found to be acceptable.

It will, of course, also be understood that if the pipe section 12 is smooth wall pipe the grate means 14 may be secured in the slot 12a by any suitable continuous or intermittent clip means.

Figure 5:
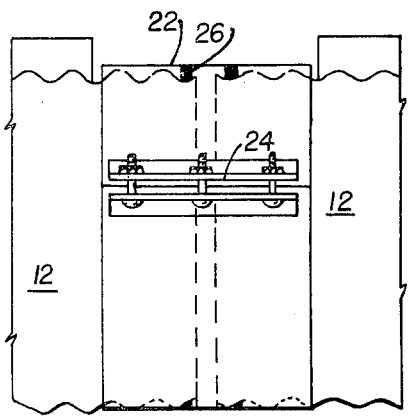
FIG. 5 is a side elevational view of an exemplary flat tension band coupling for joining abutting drainage culverts of the present invention.

Coupling means, such as shown in FIG. 5, may be provided for joining two substantially axially aligned, abutting pipe sections 12. An exemplary coupling means may comprise a coupling band 22 having a predominately flat cross section, which encircles the adjacent ends of the pipe sections, and means 24, such as angles and bolts, to tension the ends of the band 22 together. Additionally, if the pipe section 12 is provided with annular corrugations, a resilient ring 26 may be positioned in the endmost corrugation on the abutting ends of each of the pipe sections, the ring being such that it cannot extrude out of its corrugation and such that it is contiguous with the underside of the band 22 when the ends of the band 22 are tensioned together.

The drainage culvert 10 of the present invention is manufactured by first providing two elongated, vertical, parallel bearing members 16 in spaced relation and spacer means therebetween, the spacer means being substantially normal to the bearing members 16.

A spiral pipe section 12 is then longitudinally split along its upper side to form a narrow slot 12a. In practice, the pipe section may be split by saw means which comprises at least one cutting wheel. However, if the saw means comprises a set of two parallel cutting wheels, a longitudinal section of the pipe section is in fact removed.

The preassembled grate means 14, which comprises the vertical bearing members 16 and the spacer means, such as the cross bar spacer 18, is then inserted within the narrow slot 12a. Positioning clamps are utilized to set the position of the grate means 14 so that the bearing members 16 are substantially normal to the axis of the pipe section 12 and so that the spacing means are located substantially at the neutral axis of the pipe section wall 12b. Both sides of the grate means 14 are then fillet welded at selected crests and valleys of the corrugations of the surface of the pipe section wall 12b, and the fillet welds are covered with a protective coating, such as zinc, a zinc dust primer, or an asphalt base paint.

The aforementioned method for manufacturing the improved drainage culvert 10 may also include the step of providing compensation in the fabrication of the culvert by vertically raising the middle of the pipe section 12 before welding the grate means 14 thereto, whereby the bowing downwardly after welding actually causes a straight section with substantially no residual stresses remaining therein to cause distortion at a subsequent time.

In practice it has been found that the preassembled grate means 14 is preferably welded to the pipe section 12 in two stages. In the first stage, only every other one of the corrugation top fillet welds required is made, after which time the pipe is rolled to a final weld position at which the balance of the fillet welds, including the corrugation valley fillet welds, are made.

An exemplary apparatus 30 for making the improved drainage culvert 10 of the present invention is shown in FIGS. 6 through 10. The apparatus generally comprises an entry pipe station A, a pipe clamp, saw and tack welding station B, and a finish welding and exit station C.

The entry pipe station A comprises a plurality of spaced, parallel rails 31 on which the pipe sections 12 to be made into the drainage culverts 10 are initially placed and made ready for entry into the pipe clamp, saw and tack welding station B.

The pipe clamp, saw and tack welding station B includes a support means 34, which is provided substantially perpendicular to the rails 31. A plurality of pairs of opposed support rolls 36 are mounted along the support means 34, each of the support rolls being inclined toward the center line axis of the support means 34 and being individually adjustable in both a vertical and horizontal plane.

Saw means 38, comprising either a single cutting wheel which splits a pipe section, or a set of two parallel cutting wheels which will remove a longitudinal section of the pipe section, is mounted for movement on a saw track 40 along the length of the support means 34 over substantially the center thereof. Any suitable means may be provided to propel the saw means 38 along the saw track 40.

A plurality of pairs of opposed side clamps 42 are mounted along the support means 34, as best seen in FIGS. 8 and 9. Each of the side clamps is provided with an adjustable clamp fixture 44 at the end thereof. As can be seen, the adjustability of the support rolls 36, which are adjustable in both a vertical and a horizontal plane, along with the adjustability of the clamp fixtures 44, which move substantially the length of the side clamps 42, allow for the apparatus 30 to accommodate various diameters of pipe sections.

The side clamps 42 of each pair are movable toward and away from each other from a first disengaged position 46, wherein they do not contact the sides of a pipe section 12 on the support rolls 36 of the support means 34, to a second engaged position 48, wherein they contact the sides of the pipe section 12, and means are provided for moving the side clamp 42 in each of the pairs from the first disengaged position 46, to the second engaged position 48, and back again.

In a preferred embodiment the side clamp 42 on each side of the support means 34 are secured to a rotatable bar 50 running the length of the support means 34, and the means to move the side clamps 42 comprises at least one hydraulic cylinder 52 positioned between the rotatable bars 50 and means 54 connecting the piston rod 56 of the hydraulic cylinder with each of the rotatable bars 50, so that the hydraulic cylinder may be actuated to rotate the bars 50 as desired.

It has been found that it is preferable to utilize at least two hydraulic cylinders 52 to move the side clamps 42 from their first disengaged position to their second engaged position. Additionally, it has been found that hydraulic cylinders, such as the hydraulic cylinders 58, which are spring loaded, single acting - normally in the up position, and which rotate the members 59, one end of the which is rotatably connected to the support means 34, may be utilized so that the member 59 acts as a safety device to maintain the piston rods 56 of the hydraulic cylinders 52 locked and to retain the side clamps 42 in their desired positions.

It has also been found preferable to secure end clamps 60 to each of the clamp fixtures 44 of the opposed pair of side clamps 42 on each end of the support means 34. The end clamps 60a on the clamp fixture 44 at one end of the support means 34 are fixed, and the clamp fixture 60b at the other end of the support means 34 are hydraulically controlled by the hydraulic cylinder 62. Accordingly, each pipe section 12 on the support rolls 36 of the support means 34 may be longitudinally indexed by the hydraulic cylinders 62 and the end clamps 60b against the fixed set of end clamps 60a, as desired.

Figure 6:
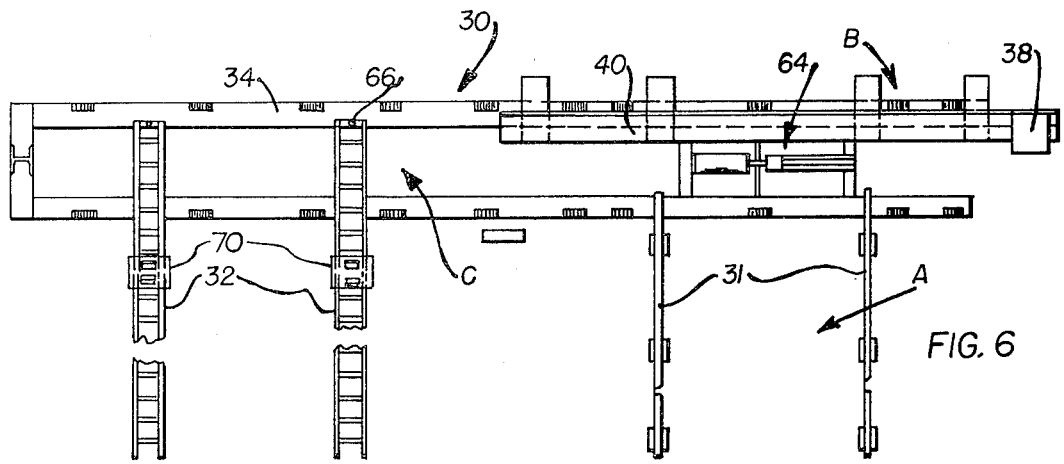
FIG. 6 is a plan view showing the apparatus for making the drainage culvert of the present invention.
Figure 7:
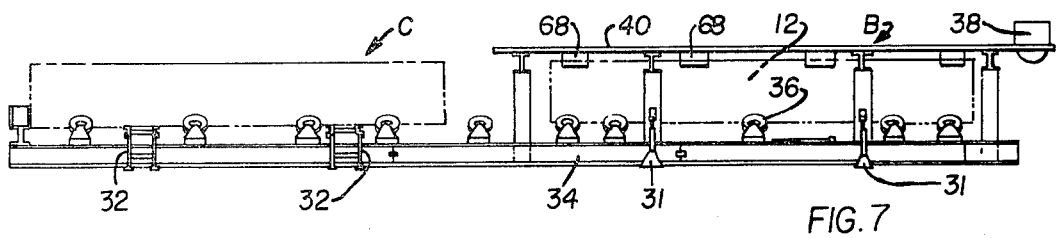
FIG. 7 is a front elevational view of the apparatus of FIG. 6.
Figure 7A:
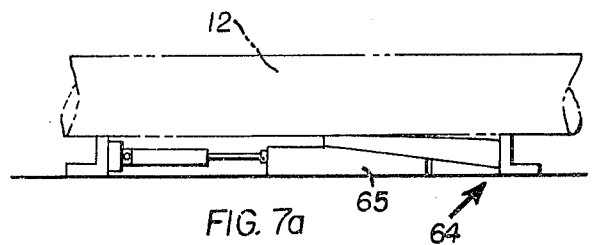
FIG. 7a is a partial, enlarged front elevational view showing the means to vertically raise the middle of the pipe section.

As best seen in FIGS. 6 and 7a, appropriate means 64, such as the adjustable tapered wedge blocks 65 are provided intermediate the support means 34 and properly positioned for pipe sections 12 of varying diameter and gage to vertically raise the middle of the pipe section resting upon the support rolls 36 of the support means 34. In this manner, compensation is made in the fabrication of the drainage culvert before welding the grate means 14 to the pipe section 12 and the subsequent tendency for the entire length of pipe section to bow downwardly in the middle after fabrication actually results in a straight section with little or no residual stresses remaining in the drainage culvert to cause distortion therein at a subsequent time.

The apparatus 30 of the present invention may also include positioning clamps 68, as best seen in FIG. 7, to set the position of the grate means 14, which is inserted in the slot 12a in the pipe section 12, so that the bearing members 16 are substantially normal to the axis of the pipe section 12 and so that the axes of the cross bar spacers 18 are located substantially at the neutral axis of the pipe section wall 12b.

Figure 10:
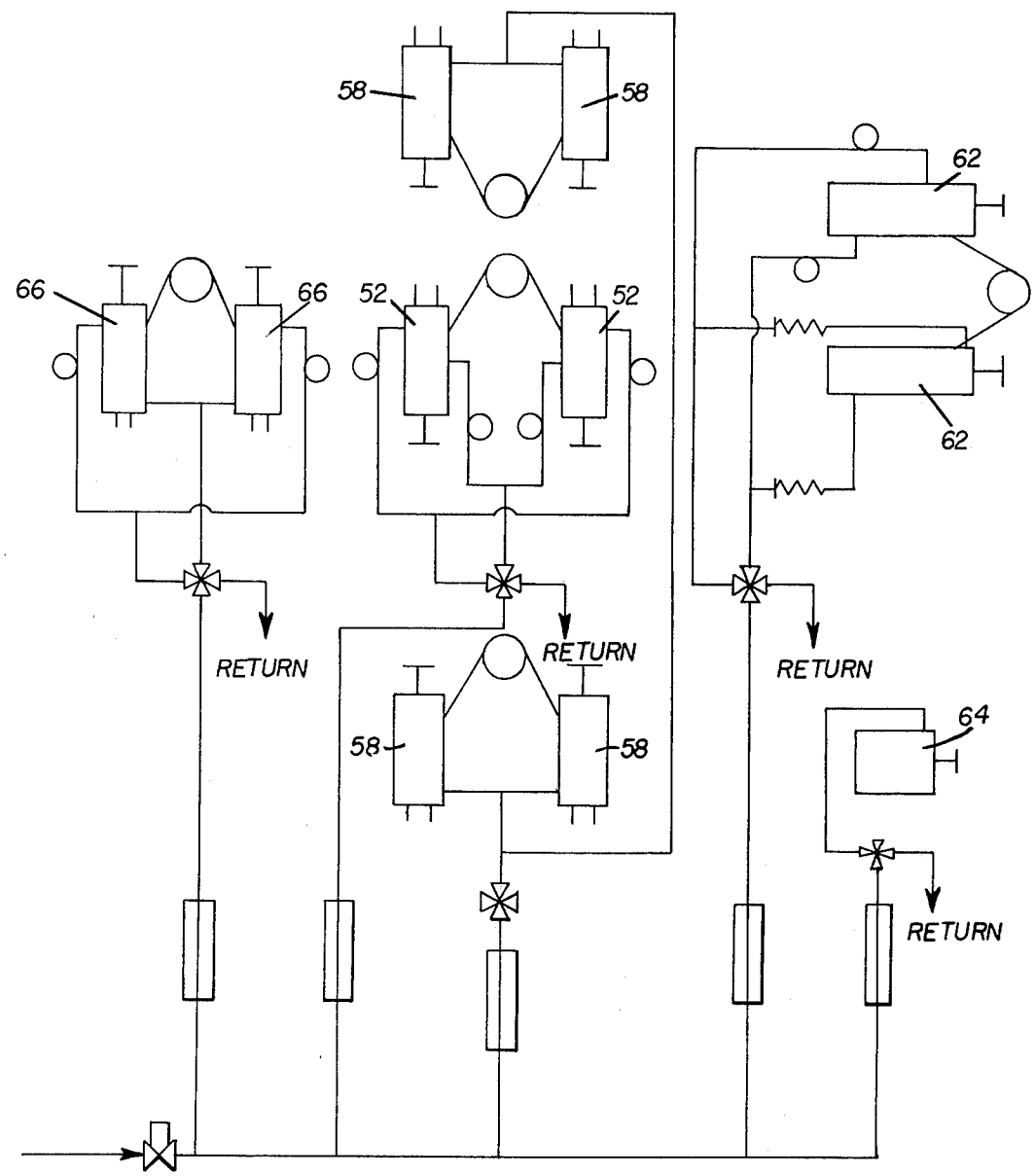
FIG. 10 is a schematic representation of the hydraulic cylinder means, valve means and associated tubing for controlling the apparatus of the present invention.

Although other means, such as air cylinders may be utilized, FIG. 10 is a schematic representation showing how the preferred hydraulic cylinders 52, 58, 62, 64 and 66, along with their respective valve means and connecting tubing, control the operation of the apparatus 30 of the present invention. In operation, a pipe section 12 is moved from the rails 31 onto the support rolls 36 of the support means 34. The hydraulic cylinders 52 are then actuated to rotate the bars 50, which move the side clamps 42 from their first disengaged position 46, to their second engaged position 48. If the pipe section 12 is not properly positioned with respect to the side clamps 42, the hydraulic cylinders 52 are actuated, opening the side clamps 42, after which the hydraulic cylinders 62 are actuated closing the end clamps 60a and 60b. The end clamps 60b are then indexed so that the pipe section 12 is properly positioned, after which the cylinders 52 and 62 are actuated so that the side clamps 42 and the end clamps 60a and 60b hold the pipe section 12 for the sawing operation. The sawing operation is accomplished by moving the saw means 38, which includes either a single cutting wheel or two parallel cutting wheels, along the saw track 40. In so doing, the pipe section 12 is either split or a longitudinal section thereof is removed.

After the sawing operation has been completed, the hydraulic cylinders 52 are actuated so that the side clamps 42 are moved to their disengaged position 46, and the preassembled grate means 14 is inserted with the slot 12a of the pipe section 12. The hydraulic cylinders 52 are again actuated so that the side clamps 42 move to their engaged position 48. Positioning clamps 68 are then utilized to set the position of the grate means 14 such that the bearing members 16 are substantially normal to the axis of the pipe section 12 and so that the spacer means, such as the cross bar spacers 18 are located substantially at the neutral axis of the pipe section wall 12. The middle of the pipe section 12 is then vertically raised and every other one of the corrugation top fillet welds are made. The hydraulic cylinders 52 and 62 are then actuated so that the end clamps 60a and 60b and the side clamps 42 free the pipe section 12, whereupon the pipe section 12 is moved from the pipe clamp, saw and tack welding station B to the finish welding and exit station C, at which station the balance of the fillet welds, including the corrugation valley fillet welds, are made, and the pipe section is removed from the apparatus 30 on the roller conveyors 32, which may be accomplished by actuating the hydraulic cylinders 66 to raise the ends of the roller conveyors 32 attached to the support means 34, thereby permitting the pipe, resting on V-type pallets 70, to leave station C.

While certain preferred embodiments of the invention have been specifically illustrated and described, it is understood that the invention is not limited thereto, as many variations will be apparent to those skilled in the art, and the invention is to be given its broadest interpretation within the terms of the following claims.

The embodiments of the invention in which an exclusive property or privilege is claimed are defined as follows:

1. An apparatus for making an open slot culvert, for positioning in a drainage area with the open slot at the top so that any surface drainage water will flow through the slot and directly into the culvert, the culvert being satisfactorily backfilled by utilizing any suitable material with the upper surface of the drainage area being substantially on a level with the upper surface of the open slot of the culvert, of the type having a metallic, pipe section, split longitudinally along its upper side to form a narrow slot, and grate means secured in said slot, said grate means comprising two spaced, vertical bearing members substantially normal to the axis of said pipe section and extending longitudinally over the major portion of the length of said slot and being joined by spacer means substantially normal to said vertical bearing members and substantially at the neutral axis of the pipe section wall, which comprises:

a. a plurality of spaced, parallel rails for feeding pipe sections;
  b. a support means substantially perpendicular to said rails, one end of each of said rails being affixed to said support means;
  c. a plurality of pairs of opposed support rolls mounted along said support means, each support roll being inclined toward the center line axis of said support means and being individually adjustable in both a vertical and a horizontal plane;
d. saw means mounted for movement along the length of said support means over substantially the center thereof;
e. a plurality of pairs of opposed side clamps mounted along said support means, said side clamps being provided with adjustable clamp fixtures at the ends thereof, said side clamps of each pair being movable toward and away from each other from a first disengaged position, wherein they do not contact the sides of a pipe section on said support rolls on said support means, to a second engaged position, wherein they contact the sides of said pipe section;
f. means for moving said side clamps in each of said pairs from said first disengaged position to said second engaged position and back again; and
g. a plurality of spaced, parallel roller conveyors for removing fabricated culverts.

2. The apparatus according to claim 1, wherein said saw means comprises a single cutting wheel which splits said pipe section.

3. The apparatus according to claim 1, wherein said saw means comprises a set of two parallel cutting wheels which will remove a longitudinal section of said pipe section.

4. The apparatus according to claim 1, including means to raise and lower together the ends of said roller conveyors, said raising and lowering means being fixed to said support means, whereby fabricated culverts may be removed from said support rolls of said support means.

5. The apparatus according to claim 1, wherein said side clamps on each side of said support means are secured to a rotatable bar running the length of said support means, and wherein said means to move said side clamps comprises at least one hydraulic cylinder positioned between said rotatable bars, means connecting the piston of said hydraulic cylinder with each of said rotatable bars, and means to actuate said hydraulic cylinder to rotate said bars as desired.

6. The apparatus according to claim 5, including an end clamp secured to each of said clamp fixtures of the opposed pair of said side clamps on each end of said support means, said end clamps on said clamp fixtures at one end of said support means being fixed at the other end of said support means being hydraulically controlled, whereby each pipe section on said support rolls of said support means may be rotatably indexed by said hydraulically controlled end clamps against said fixed end clamps, as desired.

7. The apparatus according to claim 1, wherein means are provided intermediate said support means to vertically raise the middle of a pipe section resting upon said support rolls of said support means.

8. The apparatus according to claim 1, including positioning clamps associated with said apparatus to set the position of the bearing members of the grate means which is inserted in the slot in the pipe section so that they are substantially normal to the axis of the pipe section and so that the spacer means are substantially normal to the vertical bearing members as well as being located substantially at the neutral axis of the pipe section wall.

* * * * *